(12) United States Patent
Osabe et al.

(10) Patent No.: US 9,687,794 B2
(45) Date of Patent: Jun. 27, 2017

(54) POLYSULFONE-BASED HOLLOW FIBER MEMBRANE AND HOLLOW FIBER MEMBRANE MODULE THAT PURIFIES BLOOD PREPARATIONS

(71) Applicant: Toray Industries, Inc., Tokyo (JP)

(72) Inventors: Masahiro Osabe, Otsu (JP); Tatsuya Kishikawa, Otsu (JP); Yoshiyuki Ueno, Otsu (JP); Masaaki Shimagaki, Urayasu (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/387,350

(22) PCT Filed: Mar. 28, 2013

(86) PCT No.: PCT/JP2013/059212
§ 371 (c)(1),
(2) Date: Sep. 23, 2014

(87) PCT Pub. No.: WO2013/147001
PCT Pub. Date: Oct. 3, 2013

(65) Prior Publication Data
US 2015/0053609 A1 Feb. 26, 2015

(30) Foreign Application Priority Data
Mar. 28, 2012 (JP) ................ 2012-073778

(51) Int. Cl.
*B01D 69/02* (2006.01)
*B01D 69/08* (2006.01)
*B01D 71/68* (2006.01)

(52) U.S. Cl.
CPC ............ *B01D 71/68* (2013.01); *B01D 69/02* (2013.01); *B01D 69/08* (2013.01); *B01D 69/087* (2013.01);
(Continued)

(58) Field of Classification Search
CPC ......... B01D 69/08; B01D 69/02–69/04; B01D 63/02
(Continued)

(56) References Cited

U.S. PATENT DOCUMENTS 4,964,976 A * 10/1990 Lysaght ............. A61M 1/3496
210/321.8
5,930,990 A 8/1999 Zachary et al.
(Continued)

FOREIGN PATENT DOCUMENTS

JP 54-015476 2/1979
JP 61-238834 10/1986
(Continued)

OTHER PUBLICATIONS

Gostoli (2011). Recovery of Biosynthetic Products Using Membrane Contactors, Mass Transfer—Advanced Aspects, Dr. Hironori Nakajima (Ed.), ISBN: 978-953-307-636-2, InTech p. 619-644.*
(Continued)

*Primary Examiner* — Krishnan S Menon
*Assistant Examiner* — Waqaas Ali
(74) *Attorney, Agent, or Firm* — DLA Piper LLP (US)

(57) ABSTRACT

A polysulfone-based hollow fiber membrane that purifies blood preparations, including a hydrophilic polymer on a surface thereof which contacts the blood preparation, wherein an abundance ratio of the hydrophilic polymer is from 40 to 60% by mass, and porosity at the surface is 8 to 30%.

6 Claims, 2 Drawing Sheets

(52) U.S. Cl.
CPC ...... *B01D 2325/02* (2013.01); *B01D 2325/36* (2013.01); *B01D 2325/38* (2013.01)

(58) Field of Classification Search
USPC .................................................. 210/500.23
See application file for complete search history.

(56) References Cited

U.S. PATENT DOCUMENTS

| | | | | |
|---|---|---|---|---|
| 2002/0112743 | A1* | 8/2002 | Tabani et al. ............... | 134/22.12 |
| 2004/0247682 | A1* | 12/2004 | Sugaya et al. ............... | 424/486 |
| 2006/0108288 | A1* | 5/2006 | Oishi ....................... | 210/500.23 |
| 2007/0199891 | A1 | 8/2007 | Mabuchi et al. | |
| 2008/0044643 | A1* | 2/2008 | Yokota et al. ............. | 428/308.4 |
| 2011/0017654 | A1* | 1/2011 | Ueno .................... | B01D 63/02 |
| | | | | 210/321.6 |
| 2012/0174790 | A1* | 7/2012 | Osabe et al. ........................ | 96/7 |

FOREIGN PATENT DOCUMENTS

| | | |
|---|---|---|
| JP | 62-290469 | 12/1987 |
| JP | 2000-210544 | 8/2000 |
| JP | 3594032 | 11/2004 |
| JP | 2007-289886 | 11/2007 |
| JP | 4130316 | 8/2008 |
| JP | 4304612 | 7/2009 |
| JP | 4453248 | 4/2010 |
| JP | 4483230 | 6/2010 |
| JP | 2011-78974 | 4/2011 |
| WO | 2011/021300 | 2/2011 |

OTHER PUBLICATIONS

Ikeda, K. et al., "Non-Hemolytic Transfusion Reactions Reported to Blood Centers: Cases of Respiratory Distress Concomitant with Pulmonary Edema," *Blood Programme*, 2001, vol. 23, No. 4, pp. 647-654 and 1 page English Abstract.

Sasaki, D. et al., "Comparison of Platelet Quality in Washed Platelet Concentrates Prepared with Different Synthetic Storage Solutions," *Japanese Journal of Transfusion Medicine*, 2001, vol. 47, No. 5, pp. 777-782.

Akino, M. et al., "Two Methods of Preparing Washed and/or Replaced Platelet Concentrates," *Japanese Journal of Transfusion and Cell Therapy*, 2009, vol. 55, No. 6, pp. 698-704 and 2 pages English Abstract.

Supplementary European Search Report dated Oct. 2, 2015, of corresponding European Application No. 13768390.0.

Notification of Reasons for Refusal dated Nov. 15, 2016, of corresponding Japanese Application No. 2013-514465, along with an English translation.

\* cited by examiner

POLYSULFONE-BASED HOLLOW FIBER MEMBRANE AND HOLLOW FIBER MEMBRANE MODULE THAT PURIFIES BLOOD PREPARATIONS

TECHNICAL FIELD

This disclosure relates to a polysulfone-based hollow fiber membrane and a hollow fiber membrane module that purifies blood preparations.

BACKGROUND

Donated blood used for transfusion and production of blood preparations is roughly classified into donated blood for whole blood donation and donated blood for blood component donation. Various kinds of blood preparations are produced by physically separating components of blood or the like collected by blood donation. For example, whole blood preparations, concentrated erythrocyte preparations, washed erythrocyte preparations, source plasma preparations, and blood plasma fraction preparations, respectively, are produced from blood collected by whole blood donation, and platelet preparations and blood plasma fraction preparations, respectively, are produced from specific blood components collected by blood component donation.

Platelet preparations, which are one kind of blood preparation, are thought to have a high incidence frequency of non-hemolytic transfusion reactions (Japanese Unexamined Patent Application Publication No. S62-290469). Particularly, causes of side effects such as hives, itchiness, and anaphylactic shock seem to be associated with protein (plasma) included in platelet preparations. Therefore, the removal of proteins included in platelet preparations is necessary (Japanese Unexamined Patent Application Publication No. S54-15476). In addition, similarly, erythrocyte preparations have the phenomena of non-hemolytic transfusion side effects. Accordingly, protein removal is necessary also in erythrocyte preparations.

As typical methods of removing proteins included in blood preparations such as erythrocyte preparations and platelet preparations, there are mentioned membrane separation and centrifugation processes. The membrane separation process has been used for separation between erythrocytes and protein (Japanese Unexamined Patent Application Publication Nos. S62-290469 and S54-15476) and the like, and also an improved technique such as a membrane that hardly causes clogging and staining (Japanese Unexamined Patent Application Publication No. S61-238834). On the other hand, it is pointed out that centrifugation easily causes erythrocyte hemolysis and platelet activation (Japanese Unexamined Patent Application Publication No. S61-238834). However, the Japanese Red Cross Society engaged in blood donation throughout Japan produces platelet preparations by centrifugation process so that centrifugation process has been in a dominant position as the method for protein removal.

However, the centrifugation process easily causes erythrocyte hemolysis, platelet activation, and platelet aggregation due to centrifugal force, as well as the process is not sufficient to remove proteins. Moreover, centrifugation process includes a troublesome operation in which the fractionation of a supernatant (a protein portion) requires manual labor. On the other hand, since the platelet concentration of platelet preparations is three times or more than that of whole blood, platelet preparations are blood preparations that extremely easily cause aggregation between platelets.

Even in conventional membrane separation processes, contact of platelets with the membrane causes activation and aggregation of platelets. Accordingly, until now there has been a desire for a new means of purifying platelet preparations. In addition, since the centrifugation process causes also erythrocyte hemolysis, a new technique has been desired even in separation of not only a platelet preparation but also a blood preparation through membrane separation process.

Therefore, it could be helpful to provide a hollow fiber membrane for purifying a blood preparation and a hollow fiber membrane module for purifying blood preparations, which allow for deproteinization of the blood preparation so that a highly safe blood preparation can be efficiently obtained.

We provide a polysulfone-based hollow fiber membrane and a hollow fiber membrane module that purifies blood preparations, which are described in (1) to (12) below:

(1) A polysulfone-based hollow fiber membrane that purifies blood preparations, the membrane having a hydrophilic polymer on a surface thereof which contacts the blood preparation, in which the abundance ratio of the hydrophilic polymer is from 40 to 60% by mass, and porosity at the surface is from 8 to 30%.

(2) The polysulfone-based hollow fiber membrane according to the above (1), in which the water permeability of the membrane is 20 mL/hr/Pa/m$^2$ or more.

(3) The polysulfone-based hollow fiber membrane according to the above (1) or (2), in which the roundness of pores of the surface is 1 or less.

(4) The polysulfone-based hollow fiber membrane according to any of the above (1) to (3), in which the membrane is for purifying a platelet preparation.

(5) The polysulfone-based hollow fiber membrane according to any of the above (1) to (4), in which the abundance ratio of carbon derived from ester groups on the surface is from 0.1 to 10% by number of atoms.

(6) The polysulfone-based hollow fiber membrane according to any of the above (1) to (5), in which the surface is an inner surface of the membrane.

(7) The polysulfone-based hollow fiber membrane according to any of the above (1) to (6), in which a void length X of the surface side is larger than a void length Y of a surface side opposite to the surface side.

(8) The polysulfone-based hollow fiber membrane according to the above (7), in which a value of the void length X divided by the void length Y is 1.1 or more.

(9) The polysulfone-based hollow fiber membrane according to the above (7) or (8), in which the void length X is from 0.1 to 4.0 μm.

(10) A hollow fiber membrane module that purifies blood preparations, including the polysulfone-based hollow fiber membrane according to the above (1) to (9).

(11) The hollow fiber membrane module according to the above (10), in which a value of an end face length of the module divided by the flow passage cross-sectional area thereof is from 50 to less than 200.

(12) The hollow fiber membrane module according to the above (10) or (11), in which a value of an amount of treatment of the blood preparation divided by the surface area of the surface of the hollow fiber membrane, which surface contacts the blood preparation, is from 0.05 to 0.3.

Further, we provide a polysulfone-based hollow fiber membrane that purifies platelet preparations and a hollow fiber membrane module that purifies platelet preparations, which are described in (13) to (23) below:

(13) A polysulfone-based hollow fiber membrane that purifies platelet preparations, the membrane having a hydrophilic polymer on a surface thereof which contacts the platelet preparation, in which the abundance ratio of the hydrophilic polymer is from 40 to 60% by mass, and porosity at the surface is from 8 to 30%.
(14) The polysulfone-based hollow fiber membrane according to the above (13), in which the water permeability of the membrane is 20 mL/hr/Pa/m$^2$ or more.
(15) The polysulfone-based hollow fiber membrane according to the above (13) or (14), in which the roundness of pores of the surface is 1 or less.
(16) The polysulfone-based hollow fiber membrane according to any of the above (13) to (15), in which the abundance ratio of carbon derived from ester groups on the surface is from 0.1 to 10% by number of atoms.
(17) The polysulfone-based hollow fiber membrane according to any of the above (13) to (16), in which the surface is an inner surface of the membrane.
(18) The polysulfone-based hollow fiber membrane according to any of the above (13) to (17), in which a void length X of the surface side is larger than a void length Y of a surface side opposite to the surface side.
(19) The polysulfone-based hollow fiber membrane according to the above (18), in which a value of the void length X divided by the void length Y is 1.1 or more.
(20) The polysulfone-based hollow fiber membrane according to the above (18) or (19), in which the void length X is from 0.1 to 4.0 μm.
(21) A hollow fiber membrane module that purifies platelet preparations, including the polysulfone-based hollow fiber membrane according to the above (13) to (20).
(22) The hollow fiber membrane module according to the above (21), in which a value of an end face length of the module divided by the flow passage cross-sectional area thereof is from 50 to less than 200.
(23) The hollow fiber membrane module according to the above (21) or (22), in which a value of an amount of treatment of the platelet preparation divided by the surface area of the surface of the hollow fiber membrane, which surface contacts the platelet preparation, is from 0.05 to 0.3.

The polysulfone-based hollow fiber membrane can remove proteins included in a platelet preparation while suppressing platelet activation. Therefore, the use of the polysulfone-based hollow fiber membrane in a hollow fiber membrane module enables the platelet preparation to be purified efficiently while ensuring high safety. In addition, the polysulfone-based hollow fiber membrane has a function of removing proteins in an erythrocyte preparation while suppressing, particularly, erythrocyte hemolysis. Therefore, the use of the polysulfone-based hollow fiber membrane in a hollow fiber membrane module that purifies an erythrocyte preparation enables the erythrocyte preparation to be purified efficiently while ensuring high safety.

REFERENCE SIGNS LIST

11, 12, 21, 22: Straight line

DETAILED DESCRIPTION

Figure 1:
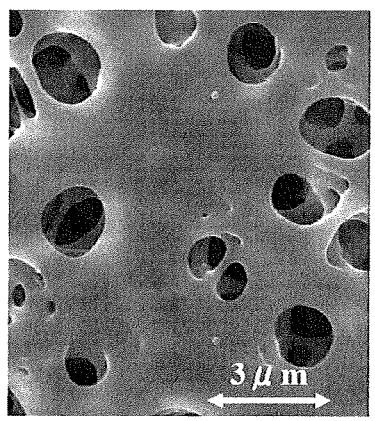
FIG. 1 is an electron micrograph of pores of a surface of the polysulfone-based hollow fiber membrane (10,000× magnification).

Our polysulfone-based hollow fiber membrane that purifies blood preparations has a hydrophilic polymer on a surface thereof which contacts the blood preparation, in which the abundance ratio of the hydrophilic polymer on the surface is from 40 to 60% by mass and porosity at the surface is from 8 to 30%.

The "blood preparation" refers to a liquid prepared by formulating human blood as raw material and refers to a liquid in which leukocytes are removed, while a blood cell component is left. For example, the "blood preparation" encompasses "erythrocyte preparations" produced by removing leukocytes from whole blood preparations prepared from donated whole blood in blood donation and "platelet preparations" prepared from platelets extracted in blood component donation.

"Platelet preparation" refers to a liquid containing platelets and proteins. Examples of the platelet preparation include a blood preparation obtained by removing erythrocytes and leukocytes from whole blood, a replaced platelet preparation or washed platelet preparation obtained by additionally removing proteins from the aforementioned blood preparation, dilutions thereof, and mixed liquids thereof. In addition, a metal salt of magnesium ion, sodium ion, calcium ion, or the like may be added thereto, and an anticoagulant such as citric acid, ethylene diamine tetraacetic acid, or heparin may be added thereto. Usually, platelet preparations have a protein concentration of from about 50 to 60 mg/mL, from which 60 to 70% by mass of proteins is removed to reduce the protein concentration to about 10 mg/mL, thereby obtaining a replaced platelet preparation, or from which 90% by mass or more of proteins is removed to reduce the protein concentration to 6 mg/mL or less, thereby obtaining a washed platelet preparation.

"Erythrocyte preparation" refers to a liquid in which the volume of erythrocytes is not less than 30% by volume and the volumes of leukocytes and platelets are not more than 5% by volume in blood. In addition, an anticoagulant such as sodium citrate, citric acid hydrate, glucose, sodium chloride, adenine, or sodium dihydrogen phosphate may be added thereto. Even in erythrocyte preparations, those whose protein concentration is reduced are used as washed erythrocyte preparations.

Furthermore, "a surface thereof which contacts the blood preparation" refers to the outer surface of a hollow fiber forming the polysulfone-based hollow fiber membrane if the type of filtration for purifying the blood preparation is external pressure filtration and refers to the inner surface thereof forming the polysulfone-based hollow fiber membrane if it is internal pressure filtration. The external pressure filtration refers to a type of filtration in which a blood preparation is supplied from the outside of the hollow fiber and a filtrate is obtained from the inside thereof. On the other hand, the internal pressure filtration refers to a type of filtration in which a blood preparation is supplied from the inside of the hollow fiber and a filtrate is obtained from the outside thereof.

The external pressure filtration has high filtration efficiency since the area of the surface thereof which contacts a blood preparation is large, whereas the internal pressure filtration is advantageous in that a short path or a drift of a blood preparation hardly occurs. The purification of a blood preparation using the polysulfone-based hollow fiber membrane is preferably performed by internal pressure filtration. In other words, the surface which contacts the blood preparation is preferably the inner surface of the hollow fiber membrane.

The term "hydrophilic polymer" refers to a water-soluble polymer or a polymer that is water-insoluble but interacts with water molecules by electrostatic interaction or hydrogen bonding. The water-soluble polymer refers to a polymer dissolved in pure water set at 25° C. at a rate of 1000 ppm or more. Examples of the polymer include a polyalkylene glycol such as polyethylene glycol or polypropylene glycol, a nonionic hydrophilic polymer such as polyvinyl alcohol, polyvinyl pyrrolidone (hereinafter referred to as 'PVP"), polyvinyl acetate, polyvinyl caprolactam, hydroxyethyl methacrylate, or methyl methacrylate, and an ionic hydrophilic polymer such as dextran sulfate, polyacrylic acid, polyethylene imine, or polyallylamine.

The abundance ratio of the hydrophilic polymer on the surface thereof which contacts the blood preparation needs to be from 40 to 60% by mass, and is preferably from 40 to 55% by mass. When the abundance ratio of the hydrophilic polymer is too low, platelets adhere to the surface of the hollow fiber membrane, causing a problem such as aggregation and activation of platelets or reduction in platelet recovery rate. In addition, in the case of erythrocytes, a problem such as erythrocyte hemolysis or reduction in erythrocyte recovery rate occurs. On the other hand, when the abundance ratio of the hydrophilic polymer is too high, not only the elution of the hydrophilic polymer but also platelet activation and protein denaturation can occur.

The abundance ratio of the hydrophilic polymer on the hollow fiber membrane surface can be calculated by measuring through an electron spectroscopy for chemical analysis (hereinafter referred to as "ESCA") at a measurement angle of 90 degrees and investigating the abundance ratios of elements in a region from the hollow fiber membrane surface to a depth of about 10 nm. More specifically, the abundance ratio thereof can be measured and calculated by the following method.

The hollow fiber membrane is cut into a half-cylindrical shape by a single-edged cutting tool, rinsed with ultrapure water, and then dried at room temperature and 0.5 Torr for 10 hours to make a measurement sample. The sample is installed in the apparatus, then the angle of the detector with respect to an incident angle of X ray is adjusted to set the measurement angle to 90 degrees, and measurement is performed. The abundance ratios of carbon atoms, nitrogen atoms, and sulfur atoms are obtained from the area intensities of respective spectra of C1s, N1s, and S2p obtained and relative sensitivity factors belonging to the apparatus.

For example, when the hydrophilic polymer on the surface which contacts the blood preparation is PVP, the abundance ratio of PVP on the surface is calculated by formula 1:

$$\text{Abundance ratio of PVP on the surface (\% by mass)} = N \times 111/(N \times 111 + S \times 442) \quad (1)$$

N: Abundance ratio of nitrogen atoms
S: Abundance ratio of sulfur atoms
111: Number of repeating units in PVP
442: Number of repeating units in polysulfone-based polymer Regarding a mechanism in which platelets adhere to the hollow fiber membrane surface, there are two pathways. A first pathway is a pathway in which platelets are activated and adhere to the hollow fiber membrane surface simultaneously with the contact thereof with the membrane surface. A second pathway is a pathway in which a protein associated with blood coagulation, such as fibrinogen, adheres to the membrane and activates platelets, inducing platelet adhesion. Therefore, to suppress the adhesion of platelets to the hollow fiber membrane surface, it is necessary to prevent the approach of platelets to the hollow fiber membrane surface and the adhesion of a protein such as fibrinogen to the hollow fiber membrane surface.

An effective means to prevent the approach of platelets to the hollow fiber membrane surface is to form a diffuse layer of a hydrophilic polymer on the membrane surface. Due to a volume exclusion effect by the diffuse layer, platelets cannot approach the hollow fiber membrane surface.

Hemolysis is a phenomenon in which cell membranes of erythrocytes are damaged by various factors such as physical, chemical, or chemical factors and the cell cytoplasm leaks out through the membranes, causing the death of the erythrocytes. Examples of the physical factors include mechanical stresses such as pressure and centrifugal force. One factor is exposure to excessive centrifugal force in the process of centrifugation. In addition, among biological factors, hemolysis is known as being caused by an antibody or complement. When signal transduction for complement activation is started by binding of an antibody to erythrocytes or by another activation mechanism, each component of the complement is sequentially activated, which is a cascade reaction. Finally, the cascade reaction leads to the formation of a channel-like protein complex passing through the cell membrane, thereby forming holes in the cell membrane and causing hemolysis.

Effective means of preventing hemolysis are to prevent mechanical stresses such as pressure and centrifugal force as mentioned above and to prevent the cascade reaction caused by the binding of an antibody to erythrocytes by forming the diffuse layer of the hydrophilic polymer on the hollow fiber membrane surface.

The formation of the diffuse layer can also prevent the adhesion of a protein such as fibrinogen to the hollow fiber membrane surface. However, when the hydrophilicity of the diffuse layer is too strong, the effect of suppressing the adhesion of a protein such as fibrinogen is degraded. The reason seems to be that bound water around the protein is trapped by the diffuse layer, as a result of which the structure of the protein is changed, causing protein adhesion to the hollow fiber membrane surface. The bound water refers to water that is present around protein and whose mobility is restricted by hydrogen bonding. Bound water is thought to stabilize the structure of protein.

Due to the reason descried above, the hydrophilic polymer is preferably a water-insoluble polymer having a slightly hydrophobic unit such as vinyl caprolactam, propylene glycol, vinyl acetate, hydroxyethyl methacrylate, or methyl methacrylate, more preferably a polymer having ester groups, and still more preferably a polymer having a side-chain ester group, such as a vinyl acetate group or a methyl acrylate group. Since the side-chain ester group such as a vinyl acetate group or a methyl acrylate group is moderately hydrophilic, no bound water seems to be trapped thereby. Meanwhile, polymers that have ester groups but are highly hydrophobic, such as polyethylene terephthalate, are not preferable.

It is difficult for a homopolymer having units of vinyl caprolactam, propylene glycol, vinyl acetate, hydroxyethyl methacrylate, methyl methacrylate, or the like to form a swollen diffuse layer. Accordingly, the hydrophilic polymer is preferably a copolymer containing the above units and units of vinylpyrrolidone, ethylene glycol, or vinyl alcohol, and more preferably a copolymer of vinylpyrrolidone and vinyl acetate, a copolymer of vinylpyrrolidone and methyl methacrylate, a copolymer of ethylene glycol and vinyl acetate, or a copolymer of ethylene glycol and methyl methacrylate, which have a well balance between water solubility and hydrophobicity.

To obtain a suitable balance between hydrophilicity and hydrophobicity in a single molecule, a random copolymer or an alternating copolymer is preferable. When these copolymers have ester groups, the ester group unit has a mole ratio of preferably from 0.3 to 0.7.

The abundance ratio of carbon derived from ester groups on the surface which contacts the blood preparation can be measured by ESCA at a measurement angle of 90 degrees and calculated by dividing the peak of an ester group-derived component from the whole peak of C1s in a region from the hollow fiber membrane surface to a depth of about 10 nm. More specifically, the abundance ratio thereof can be calculated by dividing the peak of the ester group-derived component from the whole peak of five components forming the C1s, which are a component mainly derived from CHx, C—C, C═C and C—S, a component mainly derived from C—O and C—N, a component derived from π-π* satellite, a component derived from C═O, and the ester group-derived component and obtaining a ratio of the peak area of the ester group-derived component to the area of the whole peak of C1s (hereinafter referred to as "ester group-derived peak area ratio"). The peak of the ester group-derived component appears in a range of from +4.0 to 4.2 eV from the main peak (near 285 eV) of the component derived from CHx and the like. A value obtained by multiplying the amount of carbon (% by number of atoms) in the C1s by the ester group-derived peak area ratio (measured at three positions to calculate an average value between the measured values (the value is rounded off to the first decimal place); and when the ester group-derived peak area ratio is 0.4% or less, it is regarded as being a detection limit or less) is the abundance ratio of carbon derived from ester groups on the surface which contacts the blood preparation. The abundance ratio of the ester group-derived carbon is preferably from 0.1 to not less than 10% by number of atoms, more preferably from 0.5 to not less than 5% by number of atoms, and still more preferably from 0.5 to not less than 1% by number of atoms.

The hydrophilic polymer has a weight average molecular weight of preferably from 5000 to 1500000 and more preferably from 10000 to 1000000. To retain the hydrophilic polymer on the hollow fiber membrane surface, it is advantageous to use a polymer having many crosslinking points, namely, a large weight average molecular weight. However, when the weight average molecular weight is excessively high, high viscosity or gelation makes it difficult to maintain the uniform state of hollow fiber membrane surface so that a swollen diffuse layer cannot be formed. On the other hand, when the weight average molecular weight is excessively low, the elution of the hydrophilic polymer can occur.

The hydrophilic polymer may be either a polymer having a single weight average molecular weight or a mixture of plural polymers having different weight average molecular weights. In addition, the hydrophilic polymer may be prepared by purifying a commercially available product so as to have a sharp weight average molecular weight.

When the hydrophilic polymer is PVP, preferred are PVPs referred to as K15 to K120. The weight average molecular weight of the PVP is preferably 10000 or more and more preferably 40000 or more in order to improve hydrophilicity. PVP is a water-soluble polymer prepared by vinyl polymerization of N-vinyl pyrrolidone. PVPs having various weight average molecular weights are commercially available under trade names such as RUBITEKKU (BASF), PLASDONE (ISP), and PITS CALL (Daiichi Kogyo Seiyaku).

Commercially available copolymers of PVP and vinyl acetate have weight ratios of (7/3), (6/4), (5/5), (3/7), and the like. It is preferable to use KOLLIDON VA 64 having a weight ratio of 6/4, VA 73, VA 55, or VA 37, PVC 55 (BASF), or the like.

Porosity at the surface which contacts the blood preparation needs to be from 8 to 30%, but preferably from 10 to 20%. High porosity allows reduction in the area of the hollow fiber membrane which contacts the blood preparation so that the supply flow rate and filtration amount of the blood preparation can be increased. On the other hand, excessively high porosity increases the unevenness of the hollow fiber membrane surface, whereby stimulation to erythrocytes and platelets can be increased and the strength of the hollow fiber membranes can be degraded.

The average pore diameter of pores of the surface which contacts the blood preparation is preferably 2 μm or less and more preferably 1 μm or less, since the sizes of human platelets and human erythrocytes to be separated are from 3 to 4 μm and from 7 to 8 μm, respectively. When the above average pore diameter is equal to or larger than the size of human platelets, in other words, when the above average pore diameter is not less than 3 to 4 μm, platelets can enter the pores, as a result of which not only filtration efficiency reduction due to the occlusion but also platelet activation can occur. Although the occlusion can be removed by applying high pressure, the operation can also lead to platelet activation. Additionally, when the above average pore diameter is equal to or larger than the size of human erythrocytes, in other words, when the above average pore diameter is not less than 7 to 8 μm, erythrocytes enter the pores, which can cause not only filtration efficiency reduction due to the occlusion but also hemolysis due to the removal of the occlusion by applying high pressure.

On the other hand, when the above average pore diameter is 2 μm or less, a layer of platelets, referred to as a cake layer, is stuck on the hollow fiber membrane surface and thereby filtration efficiency is temporarily reduced. However, the occlusion force of the cake layer is weak. Thus, by applying shear stress by low pressure, the layer of platelets can be separated without platelet activation or erythrocyte hemolysis.

The porosity at the surface which contacts the blood preparation and the average pore diameter of pores of the surface which contacts the blood preparation can be measured and calculated by the following method. First, an image magnified 1000 times of the surface which contacts the blood preparation is photographed by a scanning electron microscopy. Next, image processing is performed by MATROX INSPECTOR 2.2 (Matrox Electronic Systems Ltd.) such that the parts of holes are reversed to white and the other parts than the holes are reversed to black. Then, a sum (hereinafter referred to as "total pore area") of the number of white pores (hereinafter referred to as "the total number of pores") and the number of pixels in the parts of the white pores is obtained to calculate a porosity and an average pore diameter per image by formulae 2 and 3. These measurement works are repeated at random 10 positions in each of 5 hollow fiber membranes, 50 times in total to use an average value of the total 50 images as "the porosity at the surface which contacts the blood preparation". Conditions for photographing the images magnified 1000 times are as follows:

Image size: 655×740 pixels
Image resolution: 0.140845 μm/pixel
Image area S: 9615.2 μm² (length 92.3 μm×width 104.2 μm square)

Porosity (%)=total pore area/image size×100 (2)

Average pore diameter (μm)=total number of pores× (total pore area/π)$^{0.5}$ (3)

The shape of the pores of the surface which contacts the blood preparation is preferably a substantially true circle, and the roundness of the pores is more preferably 1 or less and still more preferably 0.6 or less. The roundness of the pores of the surface which contacts the blood preparation can be measured and calculated by the following method. First, using a scanning electron microscope, the surface which contacts the blood preparation is magnified 10,000 times for observation. Then, when the outline of the pore is sandwiched between geometric concentric circles and the gap between the concentric circles is the smallest, a difference between the radii of the two circles is obtained. The measurement work is repeated for 10 pores and an average value between the obtained values is defined as roundness. FIG. 1 shows an example of an electron micrograph in which the shapes of pores of the inner surface are observed.

The void length of the surface side which contacts the blood preparation is preferably 1.1 times or more, and more preferably 2 times or more than the void length of a surface side opposite to the surface side to make the contact area between the hollow fiber membrane and the blood preparation while maintaining the strength of the hollow fiber membrane. The void length is the indicator of a distance between polymer skeletons.

Figure 2:
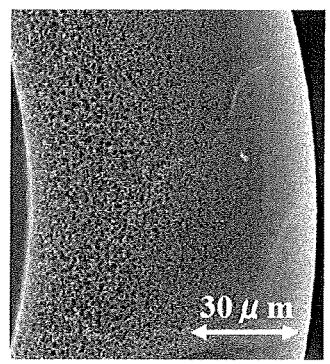
FIG. 2 is an electron micrograph of a cross section perpendicular to the longitudinal direction of the polysulfone-based hollow fiber membrane.
Figure 3:
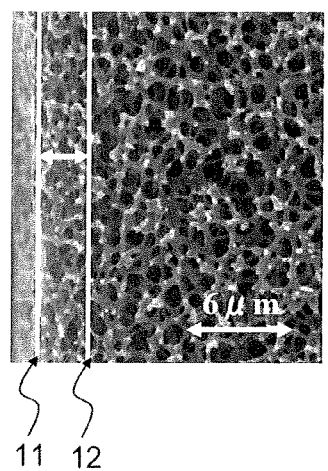
FIG. 3 is an electron micrograph of the inner surface side on the cross section perpendicular to the longitudinal direction of the polysulfone-based hollow fiber membrane (5000× magnification).
Figure 4:
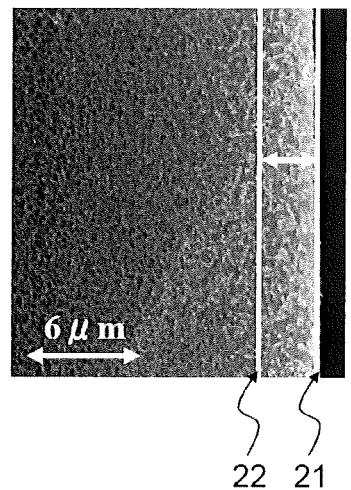
FIG. 4 is an electron micrograph of the outer surface side on the cross section perpendicular to the longitudinal direction of the polysulfone-based hollow fiber membrane (5000× magnification).

The void length can be measured by the following method. First, using an electron microscope, each of the inner surface side and the outer surface side of a cross section perpendicular to the longitudinal direction of the hollow fiber membrane is magnified 5000 times for observation. FIGS. 1, 2, and 3, respectively, show an electron micrograph of the cross section perpendicular to the longitudinal direction of the hollow fiber membrane, an electron micrograph of the inner surface side magnified 5000 times, and an electron micrograph of the outer surface side magnified 5000 times. Next, as shown in FIGS. 2 and 3, straight lines 11 and 21 are drawn on the hollow fiber membrane surface. In addition, straight lines 12 and 22 are also drawn to be parallel to the straight line 11 (or the straight line 21) and positioned at a distance of 3 μm from the straight line 11 (or the straight line 21) toward the inside of the hollow fiber membrane. Ten voids in contact with the straight line 21 (or 22) are arbitrarily selected and the length of the largest void among them is measured on each of the inner surface side and the outer surface side. The same measurements are repeated 10 times in total regarding different cross sections, and average values obtained regarding the inner surface side and the outer surface side, respectively, are used as an inner surface-side void length and an outer surface-side void length.

The void length of voids of the surface side which contacts the blood preparation is preferably from 0.1 to 4.0 μm and more preferably from 0.2 to 3.0 μm. When the void length is excessively, platelets or erythrocytes stagnate near the hollow fiber membrane surface for a long time, causing the platelets or erythrocytes to be activated. On the other hand, when the void length is excessively large, platelets or erythrocytes can pass through the hollow fiber membranes and leak out.

Like the porosity at the hollow fiber membrane surface, the water permeability of the hollow fiber membrane is an indicator that largely influences filtration resistance. The water permeability of the hollow fiber membrane is preferably 20 mL/hr/Pa/m² or more and more preferably 30 mL/hr/Pa/m² or more. When the water permeability of the hollow fiber membrane is below 20 mL/hr/Pa/m², protein filtration rate is reduced. The filtration rate can be improved by applying pressure, which can, however, lead to platelet activation.

The water permeability of the hollow fiber membrane can be measured and calculated by the following method. First, hollow fiber membranes are inserted in an plastic tube, and both ends of the hollow fiber membranes are potted to the inner walls of both end portions of the plastic tube to produce a module having an effective length of 10 cm. Next, a water pressure of $1.3 \times 10^4$ Pa is applied from the surface side of the hollow fiber membranes which contacts a blood preparation to measure the amount of water per unit time flowing out to a surface side of the hollow fiber membranes that discharges a filtrate, and then the water permeability of the hollow fiber membranes is calculated by formula 4:

Water permeability (mL/hr/Pa/m²)=$QW/(T \times P \times A)$ (4)

QW: Amount of water flown out to the side where filtrate is obtained (mL)
T: Time for applying water pressure (hr)
P: Water pressure (Pa)
A: Area of the surface side which contacts blood preparation (m²)

The "polysulfone-based hollow fiber membrane" refers to a hollow fiber membrane formed from a polysulfone-based polymer as a main raw material. The "polysulfone-based polymer" refers to a polymer having an aromatic ring, a sulfonyl group, and an ether group in the main chain thereof.

Examples of the polysulfone-based polymer include a polysulfone represented by formula (I), a polysulfone represented by formula (II), polyether sulfone, and polyallylether sulfone. Preferred is a polysulfone represented by formula (I) or a polysulfone represented by formula (II), and more preferred is a polysulfone represented by formula (I) or (II) in which "n" is from 50 to 80. The polysulfone-based polymer encompasses a block copolymer of a polysulfone represented by formula (I) or the like and another monomer and a modified product of a polysulfone represented by formula (I) or the like. In the block copolymer of a polysulfone represented by formula (I) or the like and another monomer, a structure derived from the other monomer is preferably 10% by mass or less with respect to the whole block copolymer.

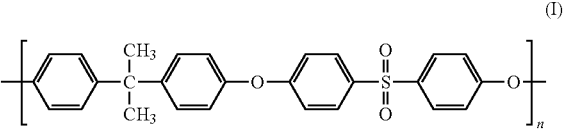

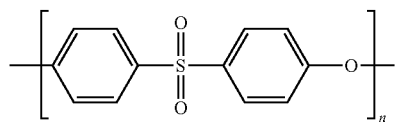

(II)

More specific examples of polysulfone include UDEL (registered trademark) polysulfone P-1700 and P-3500 (manufactured by Solvay Co., Ltd.), ULTRASON S3010 and S6010 (BASF Corporation), VICTREX (Sumitomo Chemical Co. Ltd.), RADEL-A (Solvay Co., Ltd.), and ULTRASON E (BASF Corporation).

Examples of a method of allowing the hydrophilic polymer to be present on the surface of the hollow fiber membrane which contacts the blood preparation include the addition of the hydrophilic polymer in the membrane-forming raw solution or the core solution of the hollow fiber membrane in the membrane formation process and the coating of the membrane with the hydrophilic polymer after the formation of the membrane. More specifically, for example, the above methods can be used in a membrane formation process in which using an orifice type coaxial cylindrical spinneret, a membrane-forming raw solution containing a polysulfone-based polymer and a core solution are simultaneously discharged from an outer tube and an inner tube, respectively, of the spinneret, passed through a dry section, then immersed and solidified in a solidification bath containing a solidification solution, and furthermore followed by hot-water washing.

The concentration of the polysulfone-based polymer included in the above membrane-forming raw solution is preferably from 10 to 25% by mass and more preferably from 15 to 20% by mass. The concentration of the polysulfone-based polymer largely influences the porosity at the hollow fiber membrane surface. When the concentration of the polysulfone-based polymer is excessively high, the cohesive force between the polysulfone-based polymer molecules becomes strong in the membrane formation process, causing a problem such as pressure increase or porosity reduction. On the other hand, excessively low concentrations of the polysulfone-based polymer increase the porosity but can cause fiber breakage due to the insufficient strength of the hollow fiber membrane.

The core solution in the above membrane formation process refers to a solution containing a good solvent for the polysulfone-based polymer, and examples of the good solvent include dimethylacetamide (hereinafter referred to as "DMAc"), dimethylformamide, N-methyl pyrrolidone, dimethylsulfoxide, glycerin, and mixed solvents thereof. To increase spinning stability, to the core solution may be added a copolymer containing PVP and vinylpyrrolidone, polyethylene glycol, polyvinyl alcohol, polyacrylic acid, polyethyleneimine, or the like.

The composition of the core solution largely influences the porosity at the hollow fiber membrane surface, the average pore diameter, the shape of pores, the void length, and the abundance ratio of the hydrophilic polymer. Increasing the concentration of the good solvent included in the core solution allows the alleviation of the cohesion between the polysulfone-based polymer molecules and there can be obtained a hollow fiber membrane having high porosity at the hollow fiber membrane surface. Adding the hydrophilic polymer to the core solution allows the hydrophilic polymer to be localized on the inner surface of the hollow fiber membrane, as well as allows the hydrophilic polymer to be a core to induce phase separation. Thus, there can be obtained a hollow fiber membrane with high abundance ratio of the hydrophilic polymer and high porosity at the inner surface of the hollow fiber membrane.

When the surface which contacts a blood preparation is the inner surface, the temperature of the core solution in the above membrane formation process is preferably lower by 5° C. or more, and more preferably by 10° C. or more, than the temperature of the membrane-forming raw solution. By setting the temperature of the core solution lower than that of the membrane-forming raw solution, the diffusion velocity of the core solution can be moderated, so that the porosity and the abundance ratio of the hydrophilic polymer on the inner surface of the hollow fiber membrane can be increased. On the other hand, when the surface which contacts the blood preparation is the outer surface, the temperature of the core solution is preferably higher than that of the membrane-forming raw solution.

The dew point temperature of the dry section in the membrane formation process largely influences, particularly, the outer surface of the hollow fiber membrane. Management of the dew point temperature allows the control of phase separation reaction of the membrane-forming raw solution and, for example, a dense layer can be formed by supplying water to the outer surface of the hollow fiber membrane. When the surface which contacts the blood preparation is the inner surface, it is preferable to control humidity to a dew point of from 20 to 40° C. On the other hand, when the surface which contacts the blood preparation is the outer surface, it is preferable to control humidity to a dew point of from 30 to 50° C.

The length of the dry section in the membrane formation process determines a time from the formation of pores on the hollow fiber membrane surface to solidification and is preferably from 10 to 250 mm. When the length of the dry section is excessively short, the average pore diameter on the hollow fiber membrane surface becomes small. On the other hand, when the dry section is excessively short, fiber shaking can occur in the membrane formation process.

The solidification solution in the membrane formation process refers to a poor solvent for the polysulfone-based polymer such as alcohol, water, or glycerin. Preferred is water.

The temperature of the solidification bath in the membrane formation process is preferably from 30 to 90° C. and more preferably from 40 to 60° C. The temperature of the solidification bath largely influences the average pore diameter on the hollow fiber membrane surface, solvent removal rate, and the water permeability of the obtained hollow fiber membrane. When the temperature of the solidification bath is excessively low, the pore diameter of the outer surface of the hollow fiber membrane becomes small and thus the water permeability is reduced, causing the hydrophilic polymer to remain excessively. On the other hand, when the temperature of the solidification bath is excessively high, the porosity at the hollow fiber membrane surface becomes high so that separation between platelets or erythrocytes and proteins can become difficult. Since the viscosity of the membrane-forming raw solution influences the solvent removal rate, it is important to change the temperature of the solidification bath as needed depending on the viscosity of the raw solution.

It is preferable to add a good solvent for the polysulfone-based polymer to the solidification bath in the membrane formation process in a ratio of from 3 to 10% by mass, in addition to the solidification solution such as water. By adding a good solvent, the diffusion velocity of the core solution in solvent removal can be moderated, whereby the void length ratio between both surfaces of the hollow fiber membrane can be made suitable. When the concentration of the good solvent is excessively low, it is difficult to control the void length ratio between both surfaces of the hollow fiber membrane. On the other hand, excessively high concentrations of the good solvent can lead to the excessive promotion of solvent removal in the hydrophilic polymer.

The hot water washing in the membrane formation process refers to that the hollow fiber membrane after having been immersed in the solidification bath is immersed in a hot water bath set at 60° C. or more for 1 minute or more. The hot water washing removes excesses of the solvent and the hydrophilic polymer remaining on the hollow fiber membrane. When the hydrophilic polymer has been added to the core solution, an additional hot water washing is preferably performed after winding up the hollow fiber membrane washed with hot water and cutting the membrane into a predetermined length to divide into small pieces, in order to effectively remove the excess of the hydrophilic polymer and improve the water permeability of the hollow fiber membrane. More specifically, preferably, the hollow fiber membrane after having been washed with hot water is wound up and cut into 400 mm to divide into small pieces, and then a bundle of the small hollow fiber membrane pieces is wrapped in gauze to be subjected to an additional hot water washing in hot water set at 70° C. or more for 1 to 5 hours. By performing hot water washing in hot water set at 90° C. or more, the excess of the hydrophilic polymer not impregnated in the hollow fiber membrane and the part of the hydrophilic polymer filled in the pores of the hollow fiber membrane surface are eluted in the hot water and thus can be removed. When the temperature of the hot water is below 70° C. or the time of the hot water washing is below 1 hour, the washing effect is insufficient and an amount of the hydrophilic polymer that is more than necessary can be eluted from the hollow fiber membrane.

The hollow fiber membrane after having been washed with hot water is in a wet state. However, in this state, the water permeability of the hollow fiber membrane is instable. Accordingly, a drying step needs to be performed. The temperature of the drying step is preferably 100° C. or more in terms of evaporation of water and preferably 180° C. or less so as not to exceed a glass transition point of the polysulfone-based polymer.

In the polysulfone-based hollow fiber membrane that purifies blood preparations, the abundance ratio of the hydrophilic polymer on the surface which contacts the blood preparation is from 40 to 60% by mass, which is high. It is, therefore, important to suppress the elution of the hydrophilic polymer. To suppress the elution of the hydrophilic polymer, it is effective to perform heat crosslinking and radiation crosslinking of the obtained hollow fiber membrane.

In the heat crosslinking that heats the obtained hollow fiber membrane, the molecules of the hydrophilic polymer present on the hollow fiber membrane surface are crosslinked with each other. To not cause a decomposition reaction while allowing the hydrophilic polymer molecules to be crosslinked with each other, the temperature of the heat crosslinking is preferably from 120 to 250° C. and more preferably from 130 to 200° C. In addition, the time of the heat crosslinking is from 1 to 10 hours and more preferably from 3 to 8 hours.

In the radiation crosslinking that applies radiation to the obtained hollow fiber membrane, the hydrophilic polymer and the polysulfone-based polymer are crosslinked with each other. To not cause a decomposition reaction while promoting the crosslinking reaction, the amount of radiation in the radiation crosslinking is preferably from 5 to 75 kGy and more preferably from 10 to 50 kGy. As the radiation to be applied, an alpha-ray, a beta-ray, an X-ray, a gamma-ray, or an electron ray is used, among which a gamma-ray or an electron ray is preferable. To facilitate the promotion of the crosslinking reaction, it is also preferable to include water in the hollow fiber membrane that is to be subjected to radiation crosslinking.

Additionally, to reduce the amount of the hydrophilic polymer to be added to the membrane-forming raw solution, heat crosslinking or radiation crosslinking is preferably performed after coating the hydrophilic polymer on the surface of the hollow fiber membrane obtained by the membrane formation process.

An example of a method of coating the hydrophilic polymer on the hollow fiber membrane surface is to immerse the hollow fiber membrane in a solution containing the hydrophilic polymer. The solvent to dissolve the hydrophilic polymer is preferably water, alcohol, or the like. The concentration of the hydrophilic polymer in the solution is determined as needed depending on the kind of the hydrophilic polymer. Excessively high concentrations of the hydrophilic polymer increase eluent matter. Accordingly, the concentration thereof is preferably from 10 ppm to 1% by mass, more preferably from 100 ppm to 0.5% by mass, and still more preferably from 1000 ppm to 0.5% by mass.

The hollow fiber membrane outer diameter of the polysulfone-based hollow fiber membrane is preferably 300 μm or more and more preferably 400 μm or more to increase a predetermined effective hollow fiber membrane area without increasing the number of the hollow fiber membranes.

The hollow fiber membrane outer diameter mentioned above refers to an average value obtained by measuring each of the outer diameters of 16 randomly selected hollow fiber membranes by a laser displacement meter (LS 5040T, KEYENCE Co., Ltd). Meanwhile, the hollow fiber membrane inner diameter refers to a value calculated by the following formula 5 from an average value "a" obtained by measuring each of membrane thicknesses of 16 randomly selected hollow fiber membranes through a 1000 times lens of MICROWATCHER (VH-Z100; KEYENCE Co., Ltd).

$$\text{Hollow fiber membrane inner diameter (μm)} = \text{hollow fiber membrane outer diameter} - 2 \times \text{membrane thickness} \quad (5)$$

Our hollow fiber membrane modules are characterized by including the polysulfone-based hollow fiber membrane.

The hollow fiber membrane module mainly includes a cylindrical case and the hollow fiber membrane packed in the case. An inlet port to introduce a blood preparation, an outlet port to discharge a filtrate, and a recovery port to recover erythrocytes or platelets, respectively, are provided near end faces of the cylindrical case.

In the internal pressure filtration of the blood preparation, the inlet port and the recovery port are preferably provided on both end faces of the case and the outlet port is preferably provided on a side face of the case.

In the external pressure filtration of the blood preparation, the inlet port and the recovery port are preferably provided on the side face of the case and the outlet port is preferably on one end face of the case.

When the inlet port or the outlet port is provided on the side face of the case, each of the ports is provided in a region from one end face of the case to preferably 20%, and more preferably 10%, of an end face length thereof. When the each port is provided near the center in the longitudinal direction of the case, the effective length of the hollow fiber membrane is reduced and thus filtration efficiency can be lowered. The "end face length" refers to a distance between both end faces in the longitudinal direction of the case.

The hollow fiber membrane may be folded like a U-letter shape or the like to be packed in the case. However, the hollow fiber membrane is preferably packed while keeping the linear shape thereof, since a folded part of the hollow fiber membrane becomes a point of resistance to cause platelets or erythrocytes to stagnate, thereby facilitating platelet activation or erythrocyte hemolysis.

The hollow fiber membrane packed in the case is adhered and fixed to the case by pouring a potting agent between the membrane and the inner wall of the case, that is, by potting. As an example of the position of the potting, potting is made at positions near both ends of the case (two positions).

When the end face length is long, the degree of accumulation of platelets and erythrocytes on the hollow fiber membrane surface reduces. However, excessive end face lengths prolong the time of contact between platelets or erythrocytes and the hollow fiber membrane surface, thus facilitating platelet activation or erythrocyte hemolysis. Additionally, when flow passage cross sectional area is small, supply linear velocity becomes fast and platelets and erythrocytes hardly accumulate on the hollow fiber membrane surface. However, when the flow passage cross sectional area is excessively small, pressure loss on the module increases, which can lead to platelet activation or erythrocyte hemolysis. For this reason, a value of the end face length divided by the flow passage cross sectional area is preferably from 50 to 200 and more preferably from 70 to 180. The flow passage cross sectional area refers to a value calculated by formula 6 (for internal pressure filtration) or formula 7 (for external pressure filtration).

$$\text{Flow passage cross sectional area (cm}^2\text{)} = (\text{hollow fiber membrane inner diameter}/2)^2 \times \pi \times \text{number of hollow fiber membranes} \quad (6)$$

$$\text{Flow passage cross sectional area (cm}^2\text{)} = \pi \times \{(\text{case inner diameter}/2)^2 - \text{hollow fiber membrane inner diameter}/2)^2 \times \text{number of hollow fiber membranes}\} \quad (7)$$

The packing ratio of the hollow fiber membrane in internal pressure filtration is preferably from 10 to 60% and more preferably from 20 to 50%. When the packing ratio is excessively low, the blood preparation stagnates near the inlet port, facilitating platelet activation and erythrocyte hemolysis. On the other hand, when the packing ratio is excessively high, the filtrate hardly flows outside the hollow fiber membrane, thereby not only causing reduction in protein removal efficiency, but also hampering the infiltration of the potting agent, which can cause the agent to leak out.

The packing ratio of the hollow fiber membrane in external pressure filtration is preferably from 20 to 60% and more preferably from 30 to 55%. Excessively low packing ratios cause a short path or a drift of a blood preparation, thereby reducing protein removal efficiency. On the other hand, excessively high packing ratios make it difficult for the blood preparation to flow through the hollow fiber membrane, thereby reducing protein removal efficiency.

The packing ratio is calculated by formulae 8 and 9:

$$\text{Packing ratio (\%)} = \{\pi \times (\text{hollow fiber membrane outer diameter}/2)^2 \times \text{number of hollow fiber membranes}\}/D \quad (8)$$

$$D = \pi \times (\text{case inner diameter}/2)^2 \quad (9)$$

The number of hollow fibers forming the hollow fiber membrane packed in the hollow fiber membrane module is determined as needed depending on the porosity of the membrane, the average pore diameter thereof, or the amount of treatment of the blood preparation. A value of the amount (mL) of treatment of the blood preparation divided by the surface area of the hollow fiber membrane which contacts the blood preparation is preferably from 0.05 to 0.3 and more preferably from 0.15 to 0.28. When the value is excessively small, the contact area between platelets or erythrocytes and the hollow fiber membrane increases, which can lead to reduction in platelet recovery rate or erythrocyte hemolysis. On the other hand, when the value is excessively large, pressure loss on the module increases due to the much amount of treated liquid, whereby clogging can occur in the hollow fiber membrane. The surface area of the hollow fiber membrane is calculated by formula 10.

$$\text{Surface area of hollow fiber membrane(cm}^2\text{)} = B \times \pi \times \text{Number of hollow fiber membranes} \times C \quad (10)$$

B: Hollow fiber membrane inner diameter (μm)/10000 (for internal pressure filtration)

Hollow fiber membrane outer diameter (μm)/10000 (for external pressure filtration)

C: Hollow fiber membrane effective length (mm)/10

When the hollow fiber membrane module is used to purify a platelet preparation, the linear velocity of supplied liquid is preferably from 1 to 10 cm/sec. The linear velocity of supplied liquid refers to a value calculated by formula 11.

$$\text{Linear velocity of supplied liquid(cm/sec)} = (E/t)/\text{flow passage cross sectional area through which blood preparation flows} \quad (11)$$

E: Amount of treatment of platelet preparation t: Filtration time

When the linear velocity of supplied liquid is high, the effect of separating platelets or the like accumulated on the hollow fiber membrane is expectable. However, linear velocities of supplied liquid higher than 10 cm/sec can cause platelet activation.

An example of a method that purifies a platelet preparation using the hollow fiber membrane module is a method including a filtration step that filters components other than platelets and a recovery step of recovering unfiltered platelets in a storage solution. The storage solution refers to a solution that exhibits buffer action against platelets, such as ACD solution, PAS III-M, M-sol, or physiological saline.

To effectively separate a cake layer stuck on the hollow fiber membrane surface in the filtration step, shear rate that gives load to the hollow fiber membrane surface is preferably from 10 to 2000 sec$^{-1}$, more preferably from 100 to 1500$^{-1}$, and still more preferably from 400 to 1200 sec$^{-1}$. When the shear rate is excessively low, the effect of separating the cake layer stuck is reduced, as a result of which platelets are accumulated on the hollow fiber membrane surface, causing not only difficulty in protein filtration but also platelet activation. On the other hand, when the shear rate is excessively high, platelet activation can occur.

The shear rate refers to a blood preparation flow rate for applying shear stress to the hollow fiber membrane surface, and more specifically, refers to a value calculated by formulae 12 to 14:

$$\text{Shear rate (1/sec)} = 4 \times F/G \quad (12)$$

F: Linear velocity of supplied liquid (cm/sec)

G: Equivalent radius (radius of hollow fiber membrane inner diameter) (cm)

$$G = 2 \times (H/I) \quad (13)$$

H: Cross sectional area of conduit (cm²)
I: Length of a part of the conduit cross section which contacts platelet preparation (immersed side length) (cm)

$$H=C-\{\pi\times(\text{hollow fiber membrane inner diameter}/2)^2\times\text{number of hollow fiber membranes}\} \quad (14)$$

Filtration flow rate in the filtration step largely influences the amount of proteins removed from a platelet preparation and platelet activation. Filtration ratio refers to a value of the filtration flow rate in the filtration step divided by the flow rate of the platelet preparation supplied to the hollow fiber membrane. The filtration ratio in the filtration step is preferably from 0.2 to 0.95 and more preferably from 0.5 to 0.9. When the filtration ratio is excessively low, protein removal is insufficient. On the other hand, when the filtration ratio is excessively high, platelets are strongly pushed against the hollow fiber membrane surface, which can cause aggregation between the platelets.

The number of platelets included in each of the platelet preparation, a filtrate obtained in the filtration step, and a recovered liquid obtained in the filtration step and the recovery step can be measured by a full-automatic hemocytometer (CELLTAC-α (MEC-6318), Nihon Kohden Corporation). In addition, platelet recovery rate is calculated by formula 15:

$$\text{Platelet recovery rate (\%)}=(J+K)/L\times 100 \quad (15)$$

J: Number of platelets included in concentrated liquid
K: Number of platelets included in recovered liquid
L: Number of platelets included in platelet preparation An indicator of platelet activation by the filtration step and the recovery step is the rate of increase in CD 62P positive rate. CD 62P is a glycoprotein having a molecular weight of 140 kDa inherent in the secretory granule membrane of platelets. When platelets are activated by stimulation from outside or the like, CD 62P moves to the cell membrane surface of the platelets and expresses thereon. Accordingly, the percentage of platelets whose CD 62P is positive is an indicator showing the degree of platelet activation.

The CD 62P positive rate can be measured using a flow cytometer by the following measurement. Antibody CD 61, which is an antibody to an activation-independent platelet-specific marker, and mouse IgG are added to a sample for measurement to prepare a sample (hereinafter referred to as "sample A"), and the antibodies CD 61 and CD 62P are added to a sample for measurement to prepare a sample (hereinafter referred to as "sample B"). Using the sample A, platelets are gated by fluorescence labeling of CD 61 in addition to a platelet gate by a light scattering pattern on a flow cytometer. Next, using fluorescence labeling of the mouse IgG for platelets, platelets that reacted with the antibody are gated in such a manner as to allow 0.5±0.1% of platelets to exceed. While fixing the gate as it is, the sample A is replaced by the sample B and the same measurement is performed to determine CD 62P positive rate from the percentage of the number of platelets exceeding the fixed gate. The rate of increase in CD 62P positive rate is calculated by formula 16:

$$\text{Rate of increase in CD 62P activity (\%)}=M/N\times 100 \quad (16)$$

M: CD 62P activity of mixed liquid of concentrated liquid and recovered liquid
N: CD 62P activity of platelet preparation In addition, a swirling test is an effective method capable of checking the quality of a blood preparation simply and easily in a short time. Swirling refers to a phenomenon in which a swirling pattern is observed by slowly stirring a blood preparation in a container while holding it against light. Since the shape of platelets not activated is like a disc, stirring causes the disc-shaped platelets to refract light uniformly, whereby a light scattering phenomenon occurs and thus swirling is observed. On the other hand, when the shape of platelets changes due to activation, no light scattering phenomenon occurs, so that swirling decreases and disappears.

The concentration of proteins included in each of the blood preparation, the filtrate obtained in the filtration step, and the recovered liquid obtained in the filtration step and the recovered step can be measured by a quantitative analysis of total proteins. Coloring is a common method as the quantitative analysis of total proteins. The coloring method is roughly classified into Bradford method and the like using the chemical binding of a protein and a color pigment and BCA method and the like using a chelate complex of a reduced copper ion generated in the presence of a protein. Preferred is BCA method in terms of quantitative accuracy.

For measurement of protein concentration by BCA method, a commercially available BCA kit is usable. First, a BCA reagent and a calibration curve sample are prepared. According to the specifications of the kit, the BCA reagent is added to the calibration curve sample and a sample for measurement, and the obtained respective solutions are stirred using a micromixer at room temperature for 30 minutes, followed by incubation at 37° C. for 30 minutes. However, the incubation operation can be omitted if sufficient coloring is already done. After the treatment, the temperature of the sample for measurement is returned to room temperature, and then, absorbance is measured at wavelengths of 562±20 nm. Based on a calibration curve of protein concentration and absorbance obtained from the calibration curve sample, the protein concentration of the sample for measurement can be obtained. Protein removal rate is calculated by formula 17:

$$\text{Protein removal rate (\%)}=(O-P)\times 100/O \quad (17)$$

O: Protein concentration of platelet preparation
P: Protein concentration of mixed liquid of concentrated liquid and recovered liquid Furthermore, when the hollow fiber membrane module is used to purify an erythrocyte preparation, the linear velocity of supplied liquid is preferably from 0.05 to 0.5 cm/sec. The linear velocity of supplied liquid refers to a value calculated by formula 18:

$$\text{Linear velocity of supplied liquid (cm/sec)}=(Q/t)/\text{cross sectional area of flow passage through which erythrocyte preparation flows} \quad (18)$$

Q: Amount of treatment of erythrocyte preparation
t: Filtration time

When the linear velocity of supplied liquid is high, the effect of separating erythrocytes and the like accumulated on the hollow fiber membrane is expectable. However, linear velocities of supplied liquid higher than 0.5 cm/sec can cause erythrocyte hemolysis.

The method that purifies an erythrocyte preparation using the hollow fiber membrane module may be a method including a filtration step that filters components other than erythrocytes and a recovery step that recovers unfiltered erythrocytes in a storage solution. The storage solution refers to a solution that exhibits buffer action against erythrocytes such as MAP solution or physiological saline.

To effectively separate a cake layer stuck on the hollow fiber membrane surface in the filtration step, shear rate that gives load to the hollow fiber membrane surface is set to be in a range of preferably from 5 to 200 sec$^{-1}$, more preferably from 10 to 100$^{-1}$, and still more preferably from 15 to 80 sec$^{-1}$. When the shear rate is excessively low, the effect of separating the cake layer stuck is reduced, as a result of which erythrocytes are accumulated on the hollow fiber membrane surface, causing difficulty in protein filtration. On the other hand, excessively high shear rates can lead to erythrocyte hemolysis and pressure increase in filtration.

The shear rate refers to an erythrocyte preparation flow rate for applying shear stress to the hollow fiber membrane surface, and more specifically, refers to a value calculated by formulae 19 to 21:

$$\text{Shear rate (1/sec)} = 4 \times R/U \quad (19)$$

R: Linear velocity of supplied liquid (cm/sec)
U: Equivalent radius (radius of hollow fiber membrane inner diameter) (cm)

$$U = 2 \times (V/W) \quad (20)$$

V: Cross sectional area of conduit (cm$^2$)
W: Length of a part of the conduit cross section which contacts erythrocyte preparation (immersed side length) (cm)

$$V:C - \{\pi \times (\text{hollow fiber membrane inner diameter}/2)^2 \times \text{number of hollow fiber membranes}\} \quad (21)$$

Filtration flow rate in the filtration step largely influences the amount of proteins removed from an erythrocyte preparation and erythrocyte hemolysis. Filtration ratio refers to a value of the filtration flow rate in the filtration step divided by the flow rate of the erythrocyte preparation supplied to the hollow fiber membrane. The filtration ratio in the filtration step is preferably from 0.1 to 0.95 and more preferably from 0.5 to 0.9. Excessively low filtration ratios result in insufficient protein removal. On the other hand, excessively high filtration ratios cause erythrocytes to be strongly pushed against the hollow fiber membrane surface, so that erythrocyte hemolysis can occur.

The number of erythrocytes included in each of the erythrocyte preparation, a filtrate obtained in the filtration step, and a recovered liquid obtained in the filtration step and the recovery step can be measured by a full-automatic hemocytometer (CELLTAC-α (MEC-6318), Nihon Kohden Corporation). In addition, erythrocyte recovery rate is calculated by formula 22:

$$\text{Platelet recovery rate (\%)} = (X+Y)/Z \times 100 \quad (22)$$

X: Number of erythrocytes included in concentrated liquid
K: Number of erythrocytes included in recovered liquid
Z: Number of erythrocytes included in erythrocyte preparation The hemolysis rate is an effective method capable of checking the quality of an erythrocyte preparation simply and easily in a short time. Hemolysis refers to a phenomenon in which the cell membranes of erythrocytes are damaged by various factors such as physical, chemical, or biological factors and the cell cytoplasm leaks out through the membranes, causing the destruction of the erythrocytes. The hemolysis rate is used as an indicator showing the hemolysis.

The hemolysis rate can be measured using an absorption photometer by the following method. To 10 ml of an erythrocyte preparation is added 0.2 ml of rabbit defibrinated blood, and the mixture is incubated at 37° C. for 1 hour. The absorbance of a supernatant obtained after centrifugation at 750 g is measured at 576 nm. To 10 ml of physiological saline for a negative control, and to 10 ml of an injection solvent for a positive control, respectively, is added 0.2 ml of rabbit defibrinated blood. Then, similarly, absorbance is measured and calculated by formula 23. The Hemolysis rate shows the state of erythrocyte preparation and therefore is preferably 40% or less and more preferably 20% or less.

$$\text{Hemolysis rate (\%)} = (AA - AB)/(AC - AB) \times 100 \quad (23)$$

AA: Absorbance of erythrocyte preparation
AB: Absorbance of negative control
AC: Absorbance of positive control The concentration of proteins included in each of the erythrocyte preparation, the filtrate obtained in the filtration step, and the recovered liquid obtained in the filtration step and the recovered step can be measured by the quantitative analysis of total proteins. Coloring is a common method as the quantitative analysis of total proteins. The coloring method is roughly classified into the Bradford method and the like using the chemical binding of a protein and a color pigment and BCA method and the like using a chelate complex of a reduced copper ion generated in the presence of a protein. Preferred is BCA method in terms of quantitative accuracy.

For measurement of protein concentration by BCA method, a commercially available BCA kit is usable. First, a BCA reagent and a calibration curve sample are prepared. According to the specifications of the kit, the BCA reagent is added to the calibration curve sample and a sample for measurement. The obtained respective solutions are stirred using a micro mixer at room temperature for 30 minutes, and then incubated at 37° C. for 30 minutes. The incubation operation can be omitted if sufficient coloring is already done. After the treatment, the temperature of the sample for measurement is returned to room temperature, followed by the measurement of absorbance at wavelengths of 562±20 nm. The protein concentration of the sample for measurement can be obtained based on a calibration curve of protein concentration and absorbance obtained from the calibration curve sample. Protein removal rate is calculated from formula 24:

$$\text{Protein recovery rate (\%)} = (AD - AE) \times 100/AD \quad (24)$$

AD: Protein concentration of erythrocyte preparation
AE: Protein concentration of filtrate

EXAMPLES

Our membranes and modules will be described in detail below with reference to Examples, but is not limited thereto.

Example 1

A mixture of 15 parts of UDEL (registered trademark) polysulfone (P-3500, Solvay Co., Ltd.), 8 parts of PVP (K90, ISP Inc.), 75 parts of DMAC, and 2 parts of water was mixed and dissolved at 90° C., and then the resulting solution was kept at 50° C. The resulting mixture was used as a membrane-forming raw solution. In addition, 30 parts of PVP (K30, ISP Inc.) was added to a mixed liquid of 80 parts of DMAC and 20 parts of water, and the resulting mixture was mixed and dissolved. The obtained mixture was used as a core solution.

Using an orifice type coaxial cylindrical spinneret having an outer diameter 1.0 mm and an inner diameter of 0.7 mm, the membrane-forming raw solution and the core solution were simultaneously discharged from an outer tube and an inner tube, respectively, of the spinneret, passed through a dry section having a length of 80 mm set at 30° C., then immersed and solidified in a solidification bath set at 90° C. containing a mixed liquid of 90 parts of water and 10 parts of DMAC, and furthermore hot-water washed in a hot-water bath set at 80° C. The resulting product was wound up around a skein frame to obtain a hollow fiber membrane in a wet state. When the membrane formation rate was 40 m/min, the obtained hollow fiber membrane had an inner diameter of 300 μm and a membrane thickness of 80 μm.

The obtained hollow fiber membrane in the wet state was cut into small pieces with a length of 0.4 m. The membrane pieces were immersed in a hot-water bath set at 90° C. for 30 minutes to be washed with hot water, then dried at 100° C. for 10 hours, and furthermore subjected to heat crosslinking treatment at 170° C. for 5 hours by a dry heat sterilizer to obtain hollow fiber membranes.

A hollow fiber membrane module was produced using the obtained hollow fiber membranes in the following manner. First, a bundle of 528 pieces of the hollow fiber membranes obtained by the membrane formation operation described above was inserted in a cylindrical case with a size of φ18×310 mm, which was a plastic module having an outlet port provided at a position of 21 mm from an end face of the case, namely, at a position of 7% with respect to an end face length from the end face thereof. The module was immersed in a 60% by mass aqueous glycerol solution and then dried at 50° C. for a whole day and night. Next, the plastic module was installed in a centrifuge and 5 mL of a urethane resin, namely, a potting agent was poured into both ends of the plastic module through two nozzles, respectively, and the centrifuge was rotated at 60 G for 15 minutes (first potting). Then, 15 minutes later, 10 mL of the potting agent was additionally poured into both ends of the plastic module, respectively, and the module was centrifuged again at 60 G for 15 minutes (second potting) to produce a hollow fiber membrane module. In addition, an inlet port was provided at one end face of the module and a recovery port was provided at the other end face thereof.

The produced hollow fiber membrane module had a packing ratio of 34.5% and a hollow fiber membrane area of 1433 cm$^2$, and the hollow fiber membranes had an inner diameter cross-sectional area of 0.373 cm$^2$.

The inside of the produced hollow fiber membrane module was filled with 1000 ppm of an aqueous solution of VA 64 containing 0.1% by mass ethanol, and a gamma ray of 25 kGy was applied from the outside of the hollow fiber membrane module to perform a radiation crosslinking treatment by radiation exposure.

After the crosslinking treatment by radiation exposure, the water permeability of the hollow fiber membranes was 75 mL/hr/Pa/m$^2$, the porosity of the inner surface of the membranes was 9.69%, the average pore diameter of pores of the inner surface thereof was 0.55 μm, the abundance ratio of the hydrophilic polymer on the inner surface thereof was 54.2%, and the peak area percentage of carbon derived from ester groups on the inner surface thereof was 0.5% by number of atoms. In addition, the void length of the inner surface side was 1.1 μm and the void length of the outer surface side was 0.5 μm, so that the inner surface-side void length was 2.2 times the outer surface-side void length. The roundness of pores of the inner surface was 0.4.

The produced hollow fiber membrane module was used to purify a platelet preparation. Specifically, first, to 746.2 mL of SALACET F (Terumo) were added 52.2 mL of MEYLON (Otsuka Pharmaceutical Co., Ltd.), 126.8 mL of ACD-A solution manufactured by Terumo Co., Ltd. (Terumo), 1 mEq/mL of Magnesium Sulfate Corrective Injection (Otsuka Pharmaceutical Co., Ltd.), and 71.6 mL of distilled water (Otsuka Pharmaceutical Co., Ltd.) to prepare M-sol as a platelet storage solution. Additionally, the number of platelets in the platelet preparation to be purified and CD 62P activity in the platelet preparation were measured in advance.

A filtration step for 200 mL of the platelet preparation (10 units) was performed by internal pressure filtration using a blood flow pump set at 62.5 mL/min. Filtration flow rate was 50 mL/min, filtration ratio was 0.8, and shear rate was 744 sec$^{-1}$. The amount of a concentrated liquid that passed through the inside of the hollow fiber membranes in the filtration step was 40 mL. After that, the M-sol was flown to the inside of the hollow fiber membranes at 62.5 mL/min to perform a recovery step, thereby obtaining 200 mL of a recovered liquid. The concentrated liquid and the recovered liquid were mixed together, and the obtained mixed liquid was used a replaced platelet preparation. In the replaced platelet preparation, protein removal rate was 72%.

The obtained replaced platelet preparation was flown into the same hollow fiber membrane module at 62.5 mL/min to perform again a filtration step by internal pressure filtration. Filtration flow rate was 56.3 mL/min and filtration ratio was 0.9. The amount of a concentrated liquid that passed through the inside of the hollow fiber membranes in the filtration step was 20 mL. Then, the M-sol was flown to the inside of the hollow fiber membranes at 62.5 mL/min to perform a recovery step, thereby obtaining 200 mL of a recovered liquid. A mixed liquid of the concentrated liquid and the recovered liquid was obtained as a washed platelet preparation. In the washed platelet preparation, protein removal rate was 95%, platelet recovery rate was 80%, and the rate of increase in CD 62P was 1.4. In addition, a swirling test was performed for the obtained washed platelet preparation, and swirling was observed.

Example 2

A hollow fiber membrane module was produced in the same manner as Example 1.

The inside of the produced hollow fiber membrane module was filled with 1000 ppm of an aqueous solution of PVPK 90 containing 0.1% by mass ethanol, and a gamma ray of 25 kGy was applied from the outside of the hollow fiber membrane module to perform a crosslinking treatment by radiation exposure.

After the crosslinking treatment by radiation exposure, the water permeability of the hollow fiber membranes was 50 mL/hr/Pa/m$^2$, the porosity of the inner surface of the membranes was 8.5%, the average pore diameter of pores of the inner surface thereof was 0.50 μm, and the abundance ratio of the hydrophilic polymer on the inner surface thereof was 48%. In addition, the void length of the inner surface side was 1.1 μm and the void length of the outer surface side was 0.5 μm so that the inner surface-side void length was 2.2 times the outer surface-side void length.

The number of platelets in the platelet preparation to be purified and CD 62P activity in the platelet preparation were measured in advance. A filtration step for 200 mL of the platelet preparation (10 units) was performed by external pressure filtration using a blood pump set at 62.5 mL/min. Filtration flow rate was 50 mL/min, filtration ratio was 0.8, and shear rate was 744 sec$^{-1}$. The amount of a concentrated liquid that passed through the inside of the hollow fiber membranes in the filtration step was 40 mL. After that, the M-sol was flown to the inside of the hollow fiber membranes at 62.5 mL/min to perform a recovery step, thereby obtaining 200 mL of a recovered liquid. A mixed liquid of the concentrated liquid and the recovered liquid was used as a replaced platelet preparation. In the replaced platelet preparation, protein removal rate was 72%.

The obtained replaced platelet preparation was flown into the same hollow fiber membrane module at 62.5 mL/min to perform again a filtration step by internal pressure filtration. Filtration flow rate was 56.3 mL/min and filtration ratio was 0.9. The amount of a concentrated liquid that passed through the inside of the hollow fiber membranes in the filtration step was 20 mL. Then, the M-sol was flown to the inside of the hollow fiber membranes at 62.5 mL/min to perform a recovery step, thereby obtaining 200 mL of a recovered liquid. A mixed liquid of the concentrated liquid and the recovered liquid was used as a washed platelet preparation. In the washed platelet preparation, protein removal rate was 92%, platelet recovery rate was 82%, and the rate of increase in CD 62P was 1.5. In addition, a swirling test was performed for the obtained washed platelet preparation, and swirling was observed.

Example 3

A hollow fiber membrane module was produced in the same manner as Example 1.

The inside of the produced hollow fiber membrane module was filled with 1000 ppm of an aqueous solution of VA 64 containing 0.1% by mass ethanol, and a gamma ray of 25 kGy was applied from the outside of the hollow fiber membrane module to perform a crosslinking treatment by radiation exposure.

Figure 5:
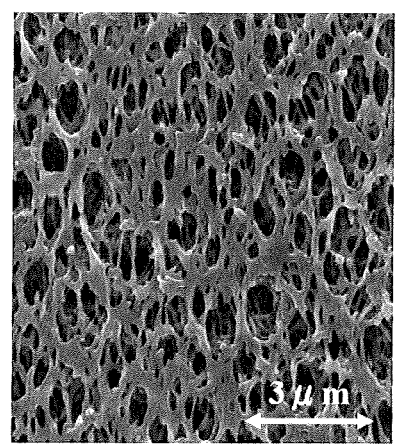
FIG. 5 is an electron micrograph of pores (a fibrillar structure) of the surface of the polysulfone-based hollow fiber membrane (10,000× magnification).

After the crosslinking treatment by radiation exposure, the water permeability of the hollow fiber membranes was 60 mL/hr/Pa/m$^2$, the porosity of the outer surface of the membranes was 14.6%, the average pore diameter of the outer surface thereof was 0.7 μm, the abundance ratio of the hydrophilic polymer on the outer surface thereof was 44.8%, and the peak area percentage of carbon derived from ester groups on the outer surface thereof was 0.8% by number of atoms. In addition, the void length of the inner surface side was 0.6 μm and the void length of the outer surface side was 1.2 so that the outer surface-side void length was 2.0 times the inner surface-side void length. Since the shape of pores of the outer surface had a fibrillar structure like intertwined fibers, the roundness of the pores of the outer surface was not be able to be measured. FIG. 5 shows an electron micrograph of the shape of the pores of the outer surface.

The number of platelets in the platelet preparation to be purified and CD 62P activity in the platelet preparation were measured in advance. A filtration step for 200 mL of the platelet preparation (10 units) was performed by external pressure filtration using a blood pump set at 9.8 mL/min. Filtration flow rate was 6.7 mL/min, filtration ratio was 0.7, and shear rate was 11 sec$^{-1}$. The amount of a concentrated liquid that passed through the outside of the hollow fiber membranes in the filtration step was 40 mL. After that, the M-sol was flown to the outside of the hollow fiber membranes at 9.8 mL/min to perform a recovery step, thereby obtaining 200 mL of a recovered liquid. A mixed liquid of the concentrated liquid and the recovered liquid was used as a replaced platelet preparation. In the replaced platelet preparation, protein removal rate was 58%.

The obtained replaced platelet preparation was flown to the same hollow fiber membrane module at 9.8 mL/min to perform again a filtration step by external pressure filtration. Filtration flow rate was 7.8 mL/min and filtration ratio was 0.8. Then, the M-sol was flown to the outside of the hollow fiber membranes at 9.8 mL/min to perform a recovery step, thereby obtaining 200 mL of a recovered liquid. A mixed liquid of the concentrated liquid and the recovered liquid was used as a washed platelet preparation. In the washed platelet preparation, protein removal rate was 80%, platelet recovery rate was 75%, and the rate of increase in CD 62P was 1.9. In addition, a swirling test was performed for the obtained washed platelet preparation, and swirling was observable.

Example 4

Hollow fiber membranes were obtained in the same manner as Example 1.

A hollow fiber membrane module was produced using the obtained hollow fiber membranes in the following manner. First, a bundle of 1200 pieces of the hollow fiber membranes obtained by the membrane formation operation described above was inserted in a cylindrical case with a size of φ30×270 mm, which was a plastic module having an outlet port provided at a position of 21 mm from an end face of the case, namely, at a position of 7% with respect to an end face length from the end face thereof. The module was immersed in a 60% by mass aqueous glycerol solution and then dried at 50° C. for a whole day and night. Next, the plastic module was installed in a centrifuge and 10 mL of a urethane resin, namely, a potting agent was poured into both ends of the plastic module through two nozzles, respectively, and the centrifuge was rotated at 60 G for 15 minutes (first potting). Then, 15 minutes later, 10 mL of the potting agent was additionally poured into both ends of the plastic module, respectively, and the module was centrifuged again at 60 G for 15 minutes (second potting) to produce a hollow fiber membrane module. In addition, an inlet port was provided at one end face of the module and a recovery port was provided at the other end face thereof.

The produced hollow fiber membrane module had a packing ratio of 28.2% and a hollow fiber membrane area of 1433 cm$^2$, and the hollow fiber membranes had an inner diameter cross-sectional area of 0.373 cm$^2$.

The inside of the produced hollow fiber membrane module was filled with 1000 ppm of an aqueous solution of VA 64 containing 0.1% by mass ethanol, and a gamma ray of 25 kGy was applied from the outside of the hollow fiber membrane module to perform a crosslinking treatment by radiation exposure.

After the crosslinking treatment by radiation exposure, the water permeability of the hollow fiber membranes was 75 mL/hr/Pa/m$^2$, the porosity of the inner surface of the membranes was 9.69%, the average pore diameter of pores of the inner surface thereof was 0.55 μm, the abundance ratio of the hydrophilic polymer on the inner surface thereof was 54.2%, and the peak area percentage of carbon derived from ester groups on the inner surface thereof was 0.5% by number of atoms. In addition, the void length of the inner surface side was 1.1 μm and the void length of the outer surface side was 0.5 μm so that the inner surface-side void length was 2.2 times the outer surface-side void length. The roundness of pores of the inner surface was 0.4.

Using the produced hollow fiber membrane module, purification of an erythrocyte preparation was performed. Specifically, a filtration step for 405 mL of the erythrocyte preparation was performed by internal pressure filtration using a blood flow pump set at 12 mL/min. Filtration flow rate was 11 mL/min, filtration ratio was 0.9, and shear rate was 62 sec$^{-1}$. The amount of a concentrated liquid that passed through the inside of the hollow fiber membranes in the filtration step was 146 mL. After that, physiological saline was flown to the inside of the hollow fiber membranes at 12 mL/min to perform a recovery step, thereby obtaining 200 mL of a recovered liquid. A protein recovery rate obtained by this treatment was 87%. Hemolysis rate was 0.05%.

Comparative Example 1

A hollow fiber membrane module was produced in the same manner as Example 1. No crosslinking treatment by irradiation exposure was performed.

The water permeability of the hollow fiber membranes was 90 mL/hr/Pa/m$^2$, the porosity of the inner surface of the membranes was 10.2%, the average pore diameter of pores of the inner surface thereof was 0.55 and the abundance ratio of the hydrophilic polymer on the inner surface thereof was 35%. In addition, the void length of the inner surface side was 1.0 μm and the void length of the outer surface side was 0.6 μm, so that the inner surface-side void length was 1.6 times the outer surface-side void length.

The number of platelets in the platelet preparation to be purified and CD 62P activity in the platelet preparation were measured in advance. A filtration step for 200 mL of the platelet preparation (10 units) was performed by internal pressure filtration using a blood pump set at 62.5 mL/min. Filtration flow rate was 50 mL/min, filtration ratio was 0.8, and shear rate was 744 sec$^{-1}$. The amount of a concentrated liquid that passed through the inside of the hollow fiber membranes in the filtration step was 40 mL. After that, the M-sol was flown to the inside of the hollow fiber membranes at 62.5 mL/min to perform a recovery step, thereby obtaining 200 mL of a recovered liquid.

A mixed liquid of the concentrated liquid and the recovered liquid was flown into the same hollow fiber membrane module at 62.5 mL/min to perform again a filtration step by internal pressure filtration. Filtration flow rate was 56.3 mL/min and filtration ratio was 0.9. After that, the M-sol was flown to the inside of the hollow fiber membranes at 62. 5 mL/min to obtain 200 mL of a recovered liquid. A mixed liquid of the concentrated liquid and the recovered liquid was used as a replaced platelet preparation. In the replaced platelet preparation, protein removal rate was 76%, platelet recovery rate was 68%, and the rate of increase in CD 62P was 2.1.

Comparative Example 2

A mixture of 18 parts of UDEL (registered trademark) polysulfone (P-3500, Solvay Co., Ltd.), 3 parts of PVP (K90, ISP Inc.), 6 parts of PVP (K30, ISP Inc.), 72 parts of DMAC, and 1 part of water was mixed and dissolved at 90° C., and then the resulting solution was kept at 50° C. The resulting mixture was used as a membrane-forming raw solution. In addition, a mixed liquid of 80 parts of DMAC and 20 parts of water was used as a core solution.

Using an orifice type coaxial cylindrical spinneret having an outer diameter 1.0 mm and an inner diameter of 0.7 mm, the membrane-forming raw solution and the core solution were simultaneously discharged from an outer tube and an inner tube, respectively, of the spinneret, passed through a dry section having a length of 80 mm set at 30° C., then immersed and solidified in a solidification bath set at 90° C. containing a mixed liquid of 90 parts of water and 10 parts of DMAC, and furthermore hot-water washed in a hot-water bath set at 80° C. The resulting product was wound up around a skein frame to obtain a hollow fiber membrane in a wet state. When the membrane formation rate was 30 m/min, the obtained hollow fiber membrane had an inner diameter of 400 μm and a membrane thickness of 100 μm.

The obtained hollow fiber membrane in the wet state was cut into small pieces with a length of 0.4 m. The membrane pieces were immersed in a hot-water bath set at 90° C. for 30 minutes to be washed with hot water, then dried at 100° C. for 10 hours, and furthermore subjected to heat crosslinking treatment at 170° C. for 5 hours by a dry heat sterilizer to obtain hollow fiber membranes.

A hollow fiber membrane module for a platelet preparation was produced in the same manner as Example 1, except for the insertion of a bundle of 400 pieces of the hollow fiber membranes obtained by the above membrane formation operation.

The inside of the produced hollow fiber membrane module was filled with 1000 ppm of an aqueous solution of VA 64 containing 0.1% by mass ethanol, and a gamma ray of 25 kGy was applied from the outside of the hollow fiber membrane module to perform a crosslinking treatment by radiation exposure.

After the crosslinking treatment by radiation exposure, the hollow fiber membrane module had a packing ratio of 44.4% and a hollow fiber membrane area of 1447 cm$^2$, and the hollow fiber membranes had an inner diameter cross-sectional area of 0.503 cm$^2$.

After the crosslinking treatment by radiation exposure, the water permeability of the hollow fiber membranes was 15 mL/hr/Pa/m$^2$, the porosity of the inner surface of the membranes was 4%, the average pore diameter of pores of the inner surface thereof was 0.5 μm, and the abundance ratio of the hydrophilic polymer on the inner surface thereof was 42%. In addition, the void length of the inner surface side was 0.1 μm and the void length of the outer surface side was 0.6 μm, so that a dense layer was present in the inner surface side.

The number of platelets in the platelet preparation to be purified and CD 62P activity in the platelet preparation were measured in advance. A filtration step for 200 mL of the platelet preparation (10 units) was performed by internal pressure filtration using a blood pump set at 62.5 mL/min. Filtration flow rate was 50 mL/min and filtration ratio was 0.8. The amount of a concentrated liquid that passed through the inside of the hollow fiber membranes in the filtration step was 80 mL. After that, the M-sol was flown to the inside of the hollow fiber membranes at 62.5 mL/min to perform a recovery step, thereby obtaining 200 mL of a recovered liquid.

A mixed liquid of the concentrated liquid and the recovered liquid was flown into the same hollow fiber membrane module at 62.5 mL/min to perform again a filtration step by internal pressure filtration. Filtration flow rate was 56.3 mL/min and filtration ratio was 0.9. After that, the M-sol was flown to the inside of the hollow fiber membranes at 62. 5 mL/min to obtain 200 mL of a recovered liquid. In a mixed liquid of the concentrated liquid and the recovered liquid, protein removal rate was 52%, platelet recovery rate was 53%, and the rate of increase in CD 62P was 4.2. In addition, a swirling test of the obtained mixed liquid was performed and no swirling was observed.

Comparative Example 3

A mixture of 16 parts of UDEL (registered trademark) polysulfone (P-3500, Solvay Co., Ltd.), 2 parts of PVP (K90, ISP Inc.), 4 parts of PVP (K30, ISP Inc.), 77 parts of DMAC, and 1 part of water was mixed and dissolved at 90° C., and then the resulting solution was kept at 50° C. The resulting mixture was used as a membrane-forming raw solution. In addition, a mixed liquid of 70 parts of DMAC and 30 parts of water was used as a core solution.

Using an orifice type coaxial cylindrical spinneret having an outer diameter 1.0 mm and an inner diameter of 0.7 mm, the membrane-forming raw solution and the core solution were simultaneously discharged from an outer tube and an inner tube, respectively, of the spinneret, passed through a dry section having a length of 250 mm set at 30° C., then immersed and solidified in a solidification bath set at 90° C. containing a mixed liquid of 90 parts of water and 10 parts of DMAC, and furthermore hot-water washed in a hot-water bath set at 80° C. The resulting product was wound up around a skein frame to obtain a hollow fiber membrane in a wet state. When the membrane formation rate was 30 m/min, the obtained hollow fiber membrane had an inner diameter of 50 μm and a membrane thickness of 300 μm.

The obtained hollow fiber membrane in the wet state was cut into small pieces with a length of 0.4 m. The membrane pieces were immersed in a hot-water bath set at 90° C. for 30 minutes to be washed with hot water, then dried at 100° C. for 10 hours and, furthermore, subjected to heat cross-linking treatment at 170° C. for 5 hours by a dry heat sterilizer to obtain hollow fiber membranes.

A hollow fiber membrane module for a platelet preparation was produced in the same manner as Example 1, except for the insertion of a bundle of 800 pieces of the hollow fiber membranes obtained by the above membrane formation operation.

The produced hollow fiber membrane module had a packing ratio of 39.5%, a hollow fiber membrane area of 2171 cm$^2$, and the hollow fiber membranes had an inner diameter cross-sectional area of 0.565 cm$^2$. No crosslinking treatment by radiation exposure was performed.

The water permeability of the hollow fiber membranes was 30 mL/hr/Pa/m$^2$, the porosity of the inner surface of the membranes was 2.8%, the average pore diameter of pores of the inner surface thereof was 0.39 μm, and the abundance ratio of the hydrophilic polymer on the inner surface thereof was 34%. In addition, the void length of the inner surface side was 0.9 μm and the void length of the outer surface side was 0.3 μm so that the inner surface-side void length was 3 times the outer surface-side void length.

The number of platelets in the platelet preparation to be purified and CD 62P activity in the platelet preparation were measured in advance. A filtration step for 200 mL of the platelet preparation (10 units) was performed by internal pressure filtration using a blood pump set at 62.5 mL/min. Filtration flow rate was 50 mL/min and filtration ratio was 0.8. During the filtration step, platelet aggregates were observed in a concentrated liquid that passed through the inside of the hollow fiber membranes and, therefore, the blood pump was stopped to stop the filtration step.

INDUSTRIAL APPLICABILITY

Our membranes can be used as a hollow fiber membrane module to purify blood preparations including erythrocyte preparations and platelet preparations in medical field.

The invention claimed is:

1. A polysulfone-based hollow fiber membrane that purifies platelet preparations comprising:
    a hydrophilic polymer on a surface thereof which contacts the platelet preparation, wherein
    an abundance ratio of the hydrophilic polymer is from 40 to 60% by mass, and
    porosity at the surface is 8 to 30%,
    wherein the hydrophilic polymer has ester groups and the abundance ratio of carbon derived from the ester groups on the surface of the membrane thereof is 0.1 to 10% by number of atoms, water permeability of the membrane is 20 mL/hr/Pa/m$^2$ to 75/mL/hr/Pa/m$^2$, and a void length of the surface side which contacts the platelet preparations is from 1.1 to 4.0 μm.

2. The polysulfone-based hollow fiber membrane according to claim 1, wherein the surface is an inner surface of the membrane.

3. The polysulfone-based hollow fiber membrane according to claim 1, wherein a void length X of the surface side is larger than a void length Y of a surface side opposite to the surface side.

4. The polysulfone-based hollow fiber membrane according to claim 3, wherein a value of the void length X divided by the void length Y is 1.1 or more.

5. A hollow fiber membrane module that purifies blood preparations comprising the polysulfone-based hollow fiber membrane according to claim 1.

6. The hollow fiber membrane module according to claim 5, wherein a value of an end face length of the module divided by a flow passage cross-sectional area thereof is 50 to less than 200 cm/cm$^2$.

\* \* \* \* \*

UNITED STATES PATENT AND TRADEMARK OFFICE
CERTIFICATE OF CORRECTION

PATENT NO.          : 9,687,794 B2
APPLICATION NO.     : 14/387350
DATED               : June 27, 2017
INVENTOR(S)         : Masahiro et al.

Page 1 of 1

It is certified that error appears in the above-identified patent and that said Letters Patent is hereby corrected as shown below:

<u>In Column 6</u>
At Line 58, please change "descried" to -- described --.

<u>In Column 10</u>
At Line 4, please insert -- small -- after "excessively".

Signed and Sealed this
Third Day of October, 2017

Joseph Matal
*Performing the Functions and Duties of the*
*Under Secretary of Commerce for Intellectual Property and*
*Director of the United States Patent and Trademark Office*